United States Patent
Davis et al.

(10) Patent No.: US 7,648,143 B2
(45) Date of Patent: Jan. 19, 2010

(54) TANDEM DUAL ELEMENT INTERSHAFT CARBON SEAL

(75) Inventors: Todd Davis, Tolland, CT (US); Armando Amador, Wethersfield, CT (US); Francis Parnin, Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 48 days.

(21) Appl. No.: 11/253,248

(22) Filed: Oct. 18, 2005

(65) Prior Publication Data

US 2007/0085278 A1 Apr. 19, 2007

(51) Int. Cl.
*F16J 15/42* (2006.01)
(52) U.S. Cl. .................. 277/349; 277/353; 277/431
(58) Field of Classification Search ............... 277/349, 277/353, 412, 429, 431–432; 415/170.1
See application file for complete search history.

(56) References Cited

U.S. PATENT DOCUMENTS

| 1,669,074 | A | * | 5/1928 | Badeker | 277/547 |
| 2,867,458 | A | * | 1/1959 | Kroekel | 277/543 |
| 3,124,502 | A | * | 3/1964 | Radke | 428/66.4 |
| 4,917,218 | A | * | 4/1990 | Murray | 184/6.11 |
| 5,058,904 | A | * | 10/1991 | Nevola | 277/370 |
| 5,301,957 | A | * | 4/1994 | Hwang et al. | 277/350 |
| 5,593,165 | A | * | 1/1997 | Murray et al. | 277/543 |
| 6,076,832 | A | * | 6/2000 | Pow | 277/546 |
| 7,134,667 | B2 | * | 11/2006 | Weiler | 277/424 |
| 2002/0071764 | A1 | * | 6/2002 | Turnquist et al. | 415/173.3 |

\* cited by examiner

*Primary Examiner*—Vishal Patel
(74) *Attorney, Agent, or Firm*—Bachman & LaPointe, P.C.

(57) ABSTRACT

A sealing system for use with at least one rotating shaft has a tandem seal arrangement contacting a surface of the at least one rotating shaft. The tandem seal arrangement includes at least one pair of segmented ring assemblies. Each of the segmented ring assemblies contacts the surface of the at least one shaft.

15 Claims, 2 Drawing Sheets

TANDEM DUAL ELEMENT INTERSHAFT CARBON SEAL

STATEMENT OF GOVERNMENT INTEREST

The Government of the United States of America may have rights in the present invention as a result of Contract No. N00019-97-C-0050 awarded by the Department of the Navy.

BACKGROUND OF THE INVENTION (1) Field of the Invention

The present invention relates to a seal arrangement for use in gas turbine engines, and more particularly to a tandem dual element seal used in the seal arrangement.

(2) Prior Art

Carbon seals have been the bearing compartment primary seal of choice in engines for many years. Segmented circumferential carbon (SCC) seals have been used in recent engines based upon their low air consumption and their ability to accommodate large relative motion in the axial direction. This sealing system consists of static components, the carbons, which are contained within a metallic housing—typically constructed of titanium or steel. The rotating component that comprises the other half of the sealing system is referred to as the seal runner. Air pressure and circumferential springs compress the static carbons against the rotating seal runner to keep the oil contained within the bearing compartment.

Referring now to FIG. 1, one approach for isolating one cavity 10 from a second cavity 12 involves the use of a single element carbon ring seal 14 on each rotating shaft. The carbon ring seal 14 separates the buffer gas cavity 10 from the cavity 12 in the bearing compartment. Adequate pressure is maintained in the cavity 10 by use of a labyrinth seal 16, which is placed between the cavity 10 and the cavity 18 to backpressure the buffer gas. There are shortcomings using this approach. For example, the approach is subject to a lack of gap control between cavity 10 and the cavity 18 via the labyrinth seal 16, which results in varying back pressure and varying seal delta P ($\Delta P$). Increasing the labyrinth seal gap, to accommodate maneuver deflections, reduces the buffer gas pressure, thereby reducing the delta P across the carbon seals. The changes in pressure in the cavity 18 greatly influences pressure in the cavity 10 and therefore the seal delta P.

Another deficiency of the prior art seal arrangements is that they are dependent upon other features, such as labyrinths, in order to seal the bearing compartment.

SUMMARY OF THE INVENTION

In the seal arrangements of the present invention, a tandem segmented, or circumferential, carbon seal configuration is used to isolate a cavity at a location where two rotating shafts are positioned.

Seal arrangements in accordance with the present invention are more robust and less reliant on other features.

The foregoing are attained by the seal arrangement of the present invention.

In accordance with the present invention, a sealing system for use with at least one rotating shaft is provided. The sealing system has a tandem seal arrangement for contacting a surface of the at least one rotating shaft. The tandem seal arrangement has a pair of segmented ring assemblies. Each of the pair of segmented ring assemblies contacts the surface of the at least one rotating shaft.

Other details of the tandem dual element intershaft carbon seal of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

A key measure of seal performance is the ability to maintain a desired pressure difference across the seal elements. This pressure difference, or $\Delta P$, is defined as positive if the pressure outside of the seal (such as in cavity 100) is higher than a bearing compartment pressure (such as that in cavity 102). Typically, a positive $\Delta P$ is required to maintain oil and cool air within the bearing compartment.

Figure 1:
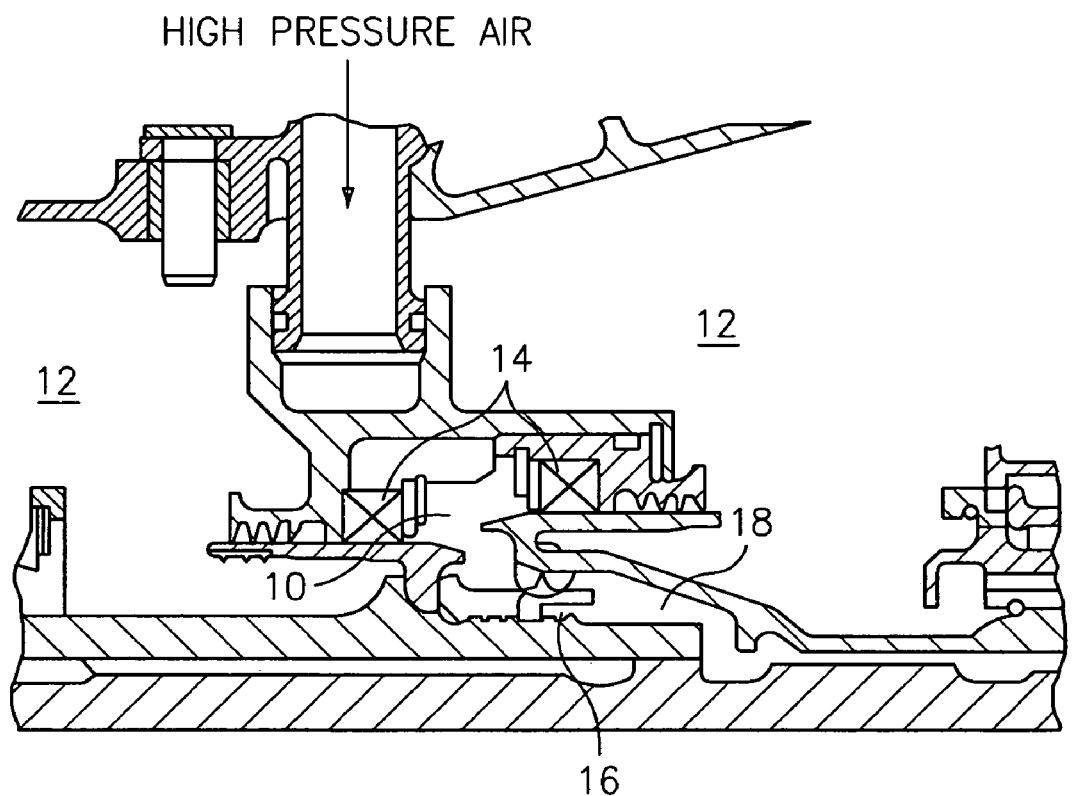
FIG. 1 illustrates a prior art single element intershaft carbon seal design.
Figure 4:
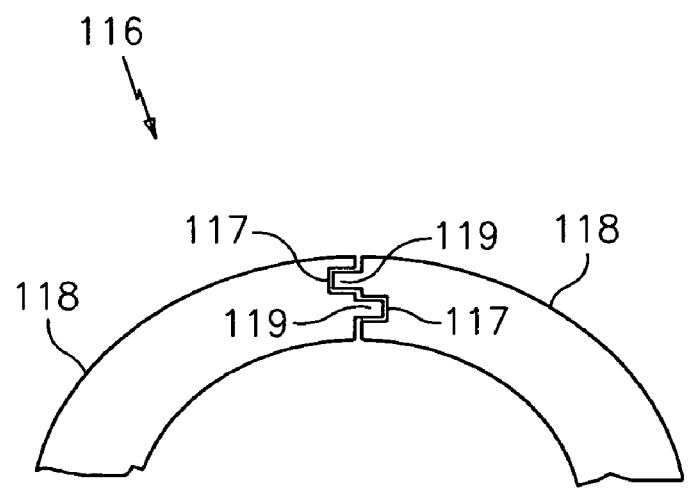
FIG. 4 illustrates a segmented ring assembly in accordance with the present invention.
Figure 2:
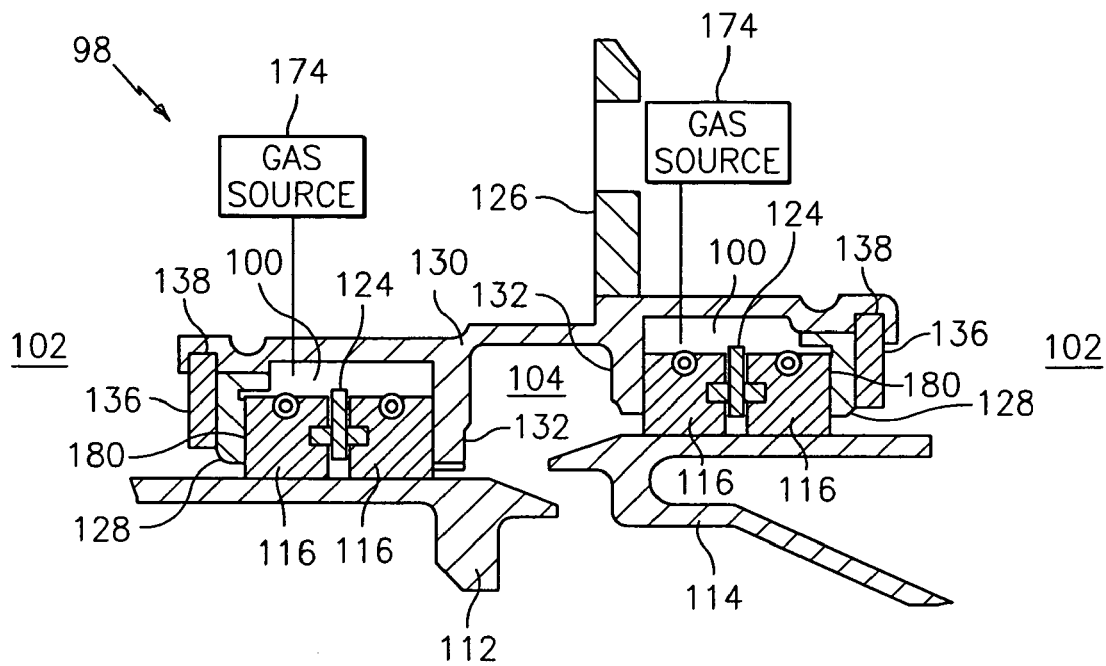
FIG. 2 illustrates a tandem segmented circumferential intershaft carbon seal system in accordance with the present invention.
Figure 3:
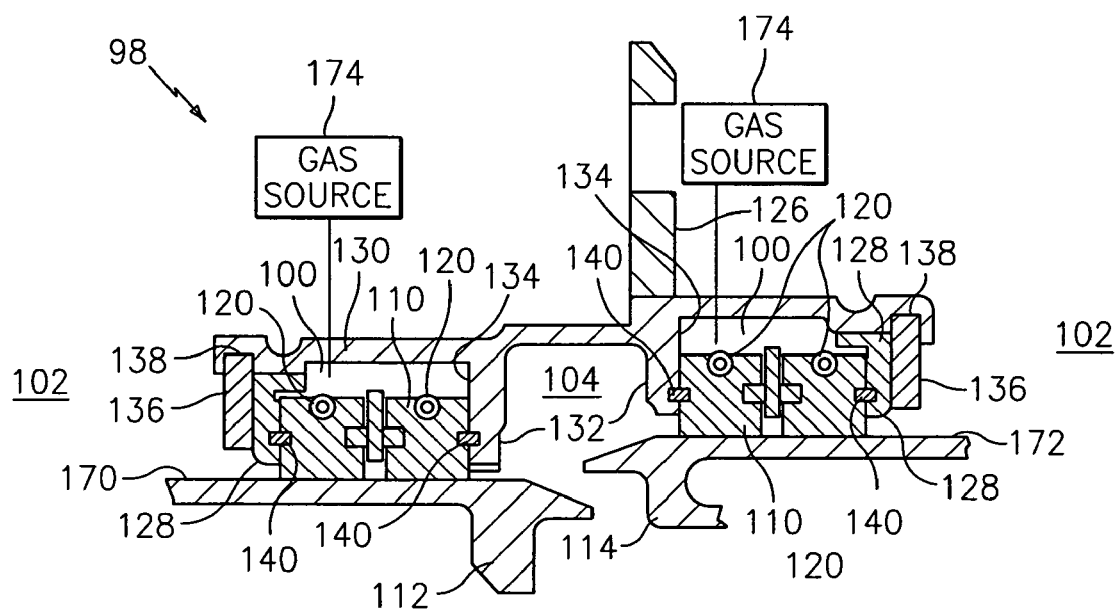
FIG. 3 is another view of the tandem segmented circumferential intershaft carbon seal system of FIG. 2.

Referring now to FIGS. 2 and 3, in accordance with the present invention, a sealing system 98 is provided. The sealing system 98 includes tandem seal arrangements 110 for separating or isolating two cavities bounded by rotating shafts 112 and 114. Each of the tandem seal arrangements 110, as shown in FIG. 4, is formed by segmented ring assemblies 116 which comprise a plurality of carbon seal elements 118. The segmented seal ring assemblies 116 formed by the carbon ring seal elements 118 replace the labyrinth seal in the prior art designs. As the carbon seal elements 118 have substantially less leakage than the labyrinth seal, the resulting delta P across the seal is higher at all operational conditions. This results in a seal that is less likely to weep oil at lower power conditions.

As shown in FIG. 4, the construction of each segmented ring assembly 116 consists of assembling a plurality of arch shaped carbon segments or elements 118, preferably three or more segments/elements, end to end to form the segmented ring assembly. Each end of a carbon segment/element 118 has a groove 117 and tongue 119 configuration to allow adjacent carbon segments/elements 118 to interlock and provide good sealing characteristics under a variety of radial excursions. Each assembled segmented circumferential ring assembly 116 is preferably radially held in place with the use of a garter spring element 120. The garter spring element 120 serves other functions including: maintaining the carbon segments 118 in contact with a respective shaft 112 or 114 during operation; and allowing the carbon segments 118 to separate and retract radially during shaft excursions. The garter spring element 120 also is used to maintain contact on a respective shaft 112 or 114 during low speed or when pressure difference, or delta P, across the seal rings is low.

As shown in FIGS. 2 and 3, the seal system 98 of the present invention preferably has two tandem seal arrangements 110 formed by pairs of segmented ring assemblies 116 at each location. Each tandem seal arrangement 110 may have a spring plate 124 sandwiched between the segmented ring assemblies 116. The spring plate 124 may contain compression springs or other spring elements that provide a force, which acts upon the carbon segments 118 forming the ring assemblies 116 and propels them against a seal housing 126 and a cover plate 128 providing the axial component of the seal. The cover plate 128 provides a sealing surface 180 against which one of the ring assemblies 116 abuts.

The seal housing 126 is where the tandem seal arrangements 110 having the carbon seal ring assemblies 116 reside. The housing 126 provides the following functionality: adjoining axial sealing surface for the segmented circumferential seal ring assemblies 116; means for providing pressurized buffer air to the segmented circumferential ring assemblies 116; providing a means for mounting; and providing a means to route any medium in cavity 100 that may have migrated past the seals.

The housing 126 may consist of a main housing 130 and a seal plate 132. The seal plate 132 provides a sealing surface 134 and a means for encapsulating the tandem seal arrangement 110. The housing 126 may also have a retaining ring 136 that is installed in a groove 138 after the carbon seal 110 and cover plate 128 is in place to secure the entire assembly.

The assembled segmented ring assemblies 116 are prohibited from rotating in the housing 126 so that premature wear of the housing 126 and/or the carbon in the assemblies 116 is not experienced. Anti-rotation devices 140 may be used to prevent rotation of the segmented ring assemblies 116. Each anti-rotation device 140 may be a pin, a tab, a keyway, or any other suitable anti-rotation mechanism known in the art. The anti-rotation devices 140 preferably do not inhibit radial motion of the carbon segments 118 either individually or as an assembly.

Tandem seals 110, which are made of carbon grade material, contact a surface 170, 172 of each respective shaft 112, 114 independently in addition to the walls of the seal housing 126 and cover plate 128 to isolate the cavity 100 from cavity 102 and vice-versa. The shafts 112 and 114 can rotate either clockwise or counterclockwise and can have similar or dissimilar sealing surface diameters.

In operation, a pressurized gaseous medium is supplied from a gas source 174 to the buffer radial annuli or cavities 100. The pressurized gas source 174 can be either a turbine engine flow path (not shown) or an independent pressure feed (not shown). The pressurized gaseous medium may be supplied to the cavities 100 from the gas source 174 using any suitable means known in the art. By supplying pressurized gas to the buffer annulus or cavities 100, carbon seal ring assemblies 116 for each shaft 112 and 114 are activated and aid in sealing of the cavities 100, 102, and 104 by either contacting, non-contacting, pressure balanced, or non-pressure balanced means. Providing a buffer gas pressure in cavity 100, above the pressures of either cavity 102 or cavity 104 will prevent communication between the cavities and thereby effectively isolate them.

The sealing system 98 of the present invention functions better than the current approach (single element seal with downstream labyrinth seal). The results using the sealing system of the present invention will be a relative high positive delta P across the seal at all engine power settings, which will minimize oil weepage. The effective isolation of cavity 100 from cavity 104 provided by the segmented carbon ring assemblies 116 also greatly reduces the sensitivity of cavity 100 pressure to changes in the pressure in cavity 104.

It is apparent that there has been provided in accordance with the present invention a tandem dual element intershaft carbon seal which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A sealing system for use with two rotating shafts, comprising:
   a first tandem seal arrangement contacting a first surface of a first one of said shafts, said first tandem seal arrangement comprising a first pair of segmented ring assembles for contacting said first surface;
   each of said segmented ring assemblies forming said first pair having a contact surface in contact with said first surface;
   a second tandem seal arrangement contacting a second surface of a second one of said shafts, said second tandem seal arrangement comprising a second pair of segmented ring assemblies for contacting said second surface;
   each of said segmented ring assemblies forming said second pair having a contact surface in contact with said second surface;
   said first tandem seal arrangement being housed in a first housing and said second tandem seal arrangement being housed in a second housing and a main housing forming a wall portion of said first housing and a wall portion of said second housing;
   said first housing having a first cavity for receiving a fluid, said first cavity bounded by a surface of said first tandem seal arrangement opposed to said contact surfaces of said segmented ring assemblies on a first side and a first surface of said wall portion of said main housing on a second opposed side and said second housing having a second cavity for receiving said fluid, said second cavity being bounded by a surface of said second tandem seal arrangement opposed to said contact surface of said segmented ring assemblies on a first side and a second surface of said wall portion of said main housing on a second opposed side;
   each of said first housing and said second housing having a seal plate which is integrally formed with said main housing and which extends inwardly from said main housing towards one of said shafts;
   said seal plates forming two opposed sides of a central cavity; and
   said fluid in said first cavity having a pressure greater than a pressure in said central cavity.

2. The sealing system according to claim 1, wherein each said seal plate provides a first sealing surface against which a first one of said segmented ring assemblies abuts.

3. The sealing system according to claim 2, wherein each said housing further comprises a cover plate for providing a second sealing surface against which a second one of said segmented ring assemblies abuts.

4. The sealing system according to claim 3, wherein each said housing has a groove and wherein a retaining ring is positioned within said groove, said retaining ring securing said respective tandem seal arrangement within said respective housing.

5. The sealing system according to claim 3, further comprising means for preventing rotation of said segmented ring assemblies in each said housing.

6. The sealing system according to claim 3, wherein said first cavity is bordered by said first surface of said wall portion of said main housing portion, said first tandem seal arrangement, said first sealing surface, and said cover plate.

7. The sealing system according to claim 6, further comprising means for supplying a pressurized fluid to said first cavity.

8. The sealing system according to claim 1, wherein each said tandem seal arrangement further comprises a spring plate positioned between said segmented ring assemblies.

9. The sealing system according to claim 1, wherein each of said segmented ring assemblies is formed from a plurality of arch shaped carbon elements.

10. The sealing system according to claim 9, wherein each of said segmented ring assemblies is formed from at least three of said arch shaped carbon elements.

11. The sealing system according to claim 9, wherein each of said shaped carbon elements has a groove and tongue arrangement at each end.

12. A sealing system for use with two rotating shafts, comprising:
- a first tandem sealing arrangement for contacting a first surface of a first one of said shafts;
- a second tandem sealing arrangement for contacting a second surface of a second one of said shafts;
- each of said tandem sealing arrangements comprising a pair of segmented ring assemblies for contacting a respective one of said first and second surfaces;
- each of said pair of segmented ring assemblies being positioned within a respective housing and having a pair of contact surfaces in contact with said respective one of said first and second surfaces;
- each said respective housing having a first wall formed by a portion of a main housing portion with an integrally formed seal plate for providing a first sealing surface against which a first one of said segmented ring assemblies abuts, and said first wall being opposed to a contact surfaces;
- each said seal plate extending inwardly from said main housing towards one of said shafts;
- said seal plates forming two opposed sides of a central cavity; and
- each said respective housing further having a cover plate, a groove within said first wall, and a retaining ring abutting said cover plate for securing said pair of segmented ring assemblies being positioned within said groove;
- each said respective housing having a cavity for receiving a fluid, said cavity being bounded by a surface of said first wall on a first side and surfaces of said pair of segmented ring assemblies opposed to said contact surfaces on a second side opposed to said first side;
- said fluid in said first cavity having a pressure greater than a pressure in said central cavity; and
- each said tandem sealing arrangement including means for preventing rotation of said segmented ring assemblies, said rotation preventing means being positioned between said cover plate and a second one of said segmented ring assemblies and engaging a groove in said cover plate and a groove in said cover plate and groove in a second one of said segmented ring assemblies.

13. The sealing system of claim 12, wherein said means for preventing rotation comprises a member selected from the group consisting of a pin, a tab, and a keyway.

14. The sealing system of claim 12, further comprising means for supplying a pressurized fluid to each said cavity.

15. The sealing system of claim 12, wherein each said tandem seal arrangement further comprises a spring plate intermediate said first one of said segmented ring assemblies and said second one of said segmented ring assemblies and a garter spring element associated with each of said segmented ring assemblies for holding each of said segmented ring assemblies in contact with a respective one of said shafts.

* * * * *